2,801,699
PROCESS FOR TEMPORARILY AND SELECTIVELY SEALING A WELL

Allyn T. Sayre, Jr., Le Roi E. Hutchings, and Orrin C. Holbrook, Crystal Lake, Ill., assignors to The Pure Oil Company, Chicago, Ill., a corporation of Ohio No Drawing. Application December 24, 1954,
Serial No. 477,590

9 Claims. (Cl. 166—22)

This invention relates to a complementary method for use in facilitating the completion or stimulation of fluid-producing zones of erratic permeability by means of formation penetrators.

Increased fluid production from subterranean reservoirs can be effected by a number of formation penetration techniques, such as acidizing or hydraulic fracturing, which enhance the efficiency of reservoir drainage. In employing these techniques, wherein fluid treating compositions are forced into the formation, e. g., acidizing or hydraulic fracturing, it is desirable to take preliminary steps in treating formations having varying intrazone permeability to insure that most of the treating fluid is injected into the less permeable streaks while little or no treating fluid is introduced into the more permeable streaks. To facilitate an understanding of the instant invention, the following geological structural distinctions are characterized, and as such are used in describing the instant invention.

A formation is any sedimentary bed or stratum sufficiently homogeneous to be regarded as a unit. Fluids such as petroleum oil, gas, and/or water may be found distributed throughout the formation or only in intervals or zones of the formation. Although a formation may be substantially homogeneous in composition, formations do occur which vary transversely in permeability due to the presence of random veins which vary respectively in permeability. Where the veins are relatively thin they are referred to as streaks. There are frequently encountered intervals or zones in the formation with alternating or successive streaks of varying permeability wherein different ratios of more permeable streaks to less permeable streaks are encountered. As a general rule, it would be preferred if the formation penetrator was introduced into those streaks having a permeability of less than about 75 millidarcies. The selective directing of the fluid treating agent into the less permeable streaks is advantageous because maximum enhancement of the flow characteristics of a formation can be obtained with a minimum amount of treating fluid.

It is therefore an object of this invention to provide an expedient to permit the selective treatment of producing intervals with formation penetrators. Another object of this invention is to provide a method for controlling the flow of the treating agent within the well bore so that it will penetrate only the formation streaks of lesser permeability. It is also an object of this invention to provide a temporary sealant for shutting off the more permeable streaks of a fluid-producing formation to control the introduction of fluid treating agents. It is also another object of this invention to provide an economical formation sealant which will penetrate and temporarily seal intervals of relatively high permeability, and which can readily be removed from the formation interstices when desired.

In overcoming interzone and intrazone permeability differentials, a number of procedures are available. Perhaps the basic or primary method for selectively treating intervals of lower permeability is the so-called two-pump procedure wherein surface oil is pumped into the annulus between the tubing and the well casing while a fluid treating reagent, such as acid, is pumped down the tubing and into the formation. Other methods for placing the flow of fluid treating agent at the proper area within the well bore employ acid jet-guns for applying acid to the face of the formation by a jetting action. In addition, mechanical packers or other types of temporary tubing bridge-plugs are used to isolate the less permeable interval from the more permeable sections of the producing formation. However, in employing these expedients entire intervals or zones are treated, including not only the less permeable streaks but also the more permeable streaks found therein.

The selective treatment of the less permeable sections of fluid-producing formations is also effected by selectively plugging the more permeable sections of the formation. A wide variety of plugging materials work, e. g., cement, colloidal clays, wax distillate, paper pulp, chemicals that metathetically react to produce an insoluble substance, air and gas (Jamin action), colloidal dispersions of rosin or paraffin wax, resin emulsions; also used are gelled plugging agents, such as petroleum distillates which have been thickened with a suitable gelling agent, e. g., kerosene thickened with an hydroxy aluminum soap. Most of these materials, however, are not inherently selective in that producing formations of varying permeability cannot be contacted indiscriminately with these materials to seal only the sections having high permeability, leaving relatively unaffected the sections of low permeability. As in the use of mechanical expedients in the sealing of geological formations of this nature, it is necessary to isolate a specific zone by mechanical packers or other suitable means of isolating formations. The sealant is then introduced into the isolated section, completely sealing off not only the channels of greater permeability but also the less permeable streaks within the isolated zone.

According to this invention, the isolation of the more permeable streaks from the less permeable streaks within a geological formation can be effected by taking advantage of the heat transfer characteristics of the formation being treated. It has been found that if an abnormal temperature is temporarily induced in a formation by a suitable means of heating, upon withdrawal of the heating means the temperature in the formation will return to normal at a rate inversely proportional to the variations in permeability. In other words, the less permeable streaks will revert to the normal formation temperatures much faster than the more permeable streaks. Advantage has been taken of this phenomenon in a co-pending patent application Serial Number 477,589 filed December 24, 1954 filed simultaneuosly herewith by Orrin C. Holbrook, wherein the formation is heated to a temperature in excess of the normal formation temperature and allowed to cool for a predetermined length of time. A liquefied temporary sealing agent in the form of a colloid sol, which will form a reversible gel at a preselected elavated temperature, is then introduced into the formation, selectively shutting off those formation streaks whose temperatures have remained substantially in excess of the predetermined criterion temperature by exclusively gelating therein. The same heat-transfer principle applies whether the formation temperature is increased or decreased. Therefore, in carrying out the instant invention to shut off the more permeable streaks, a two-component sealing solution is injected into the formation. The distance that the solution will penetrate into the formation is determined by the permeability of the various streaks which the traversing well bore exposes, i. e., the solution penetrates the various sections of formation for a distance in direct relation to the respective permeabilities. The greater the permeability of the streak, the greater distance penetrated by the sealing solution. It is preferred that the sealing solution be forced from the well bore into the formation with a dry, non-condensible gas, e. g., air, natural gas, carbon dioxide, flue gas, etc., so that the back-pressure on the formation occurring when the well is opened is minimized, and the pressure on the formations containing the solution is reduced. The sealing solution comprises an admixture of a material having a melting point lower than the normal formation temperature and a substance which is normally gaseous at the normal formation temperature and flowing bottom-hole pressure, but which can be maintained in the liquid state at the injection pressure employed. After the solution has been forced into the formation, the injection pressure is reduced, resulting in the gasification of the normally gaseous component of the sealing mixture. As a result, the formation is cooled and the sealant component of the solution is precipitated within the formation interstices plugging the entire formation. In this instance, the more permeable strata are plugged to a greater distance from the well bore than are the less permeable strata. The well is then shut in and the formation allowed to warm by natural conduction of heat. The less permeable strata will contain less of the sealant component of the solution and will revert to the normal formation temperature faster than the more permeable strata. As a result, sealant in the less permeable streaks will liquefy and flow back into the borehole. After a predetermined time has been allowed to elapse, depending upon the range in permeability of the strata to be treated, the solidified sealing material in those streaks which are to be further treated has liquefied. The formation is then contacted with a formation penetrator such as an acidizing reagent or hydraulic fracturing fluid and enters only the less permeable strata which have not been shut off from the well bore.

The instant invention is specifically illustrated by the treatment of a water-injection well employed in the secondary recovery of crude petroleum which is taking 100 barrels/day of water at 500 p. s. i. surface pressure. It is known from core analysis data that the well contains ten feet of siliceous formation from which oil is being recovered. The permeability of the top two feet of the formation is ten times the permeability of the lower eight feet of the formation. The temperature of the formation is 100° F. A spinner survey taken during water injection shows that 75 barrels/day of water is entering the top two feet, while the intake rate is only 25 barrels/day in the lower eight feet. In order to effect a uniform water distribution rate, it is desired to acidize the formation in such a way that only the bottom eight feet are treated with the acid.

In order to isolate the more permeable streak from the less permeable streak, one hundred barrels of liquid propane in which five barrels of a paraffin wax having a 90° F. melting point is dissolved and is pumped into the well. After this solution has been injected into the sand, the well is opened to the atmosphere, thus permitting the propane disposed in the well bore and formation to vaporize. The vaporization of the propane in the formation simultaneously cools the formation, precipitating the wax sealant in both streaks. The well is then allowed to warm up by conduction by a transfer of heat from the formation or formations surrounding the treated interval.

The less permeable streak is sealed for a shorter distance from the well bore and will warm up to formation temperature several hours before the more permeable streak. As a result, the solid wax sealant in the less permeable streak will revert to the liquid state. At this point, the formation interval being treated is contacted with 1500 gallons of an aqueous solution of difluophosphoric acid. As a result of the selective segregation of the more permeable streak, the acidizing medium will enter the less permeable streak. After the acid treatment, water injection into the well is resumed. The wax sealant in the more permeable streak will subsequently melt in time, and the loose streak will again take 75 barrels/day of water.

The foregoing example is only illustrative of a specific embodiment of the instant invention. It will be seen from the following discussion that a variety of techniques may be employed in carrying out this invention.

The two-component sealant solution which is employed in the instant invention comprises: First, a liquid refrigerant normally gaseous at the normal formation temperatures and bottom-hole pressure, but liquid at the formation temperature and higher injection pressure employed in this process; and second a solute which is normally liquid at the normal formation temperature but solid at temperatures slightly lower than said formation temperature. Suitable examples of refrigerants which may be utilized in the instant invention include, but are not limited to, the normally gaseous hydrocarbons, such as ethane, propane, butane; halogenated hydrocarbons, such as dichloroethylene, dichlorodifluoromethane, methyl chloride and others marketed by E. I. du Pont & Co. under the mark "Freon"; low boiling ethers, such as ethyl ether and methylethyl ether; and various inorganic substances such as ammonia and sulfur dioxide. The refrigerant also functions as a carrier for the second component, which is the sealant material, a substance having a melting point about 10° F. lower than the normal formation temperature and which is soluble or dispersible in its liquid state in the refrigerant and non-reactive therewith. Suitable examples of these substances are listed in Table I in a non-exclusive tabulation.

Table I

| Sealant | Suggested Solvent | Approximate Formation Temperature, °F. |
|---|---|---|
| Aluminum diethyl malonate | Halogenated hydrocarbon. | 220 |
| Ethyl mercuric oxide | Ether | 110 |
| Dibenzyl tin diiodide | do | 200 |
| Diethyl tin dibromide | Halogenated hydrocarbon. | 155 |
| Diphenyl tin diiodide | do | 170 |
| Ammonium formate | Ammonia | 250 |
| Petroleum-derived waxes | Hydrocarbons | [1] 100-200 |
| Lauric acid | Ether | 130 |
| Methyl cinnamate | do | 105 |
| Amyl phenol | do | 210 |
| Carnauba wax | Hydrocarbons | 200 |
| Montan wax | do | [1] 155-210 |
| Spermaceti wax | do | [1] 120-130 |
| Polyoxyalkylene glycols having a molecular weight of 1,000-7,500. | do | [1] 110-155 |

[1] Appropriate melting point substance may be selected depending upon formation temperature.

The compositions listed in Table I are by no means exhaustive. Other combinations of sealant and refrigerant-carrier suitable for use in employing the instant invention in the treating of formations having temperatures other than those listed above will be obvious to those skilled in the art. Reference to standard chemistry handbooks such as the Handbook of Chemistry and Physics, Chemical Rubber Publishing Co., are suggested for the formulation of other combinations.

For reasons of economy and convenience, it is preferred that petroleum wax and normally gaseous hydrocarbon mixtures be employed. Waxes are available in a wide variety of melting points and are readily dissolved in propane. It is, of course, preferred that solutions of sealant and refrigerant be employed. However, liquid dispersions may also be utilized.

In carrying out the instant invention, siliceous, calcareous or dolomitic formations may be treated. Prior to the selective treatment of the formation, it is, of course, necessary to make a suitable lithologic and stratigraphic study of the formation in order to obtain the greatest benefit from the instant invention, which is particularly adapted to isolating less permeable zones having permeabilities of less than about 50 millidarcies. A specific line of demarcation between those streaks which will be isolated and those streaks which will not be isolated cannot be specifically set forth inasmuch as the time element involved is an important factor in the invention. In other words, as has been pointed out above, the less permeable streaks will warm much faster than the highly permeable streaks. Therefore, depending upon the temperature existing in the formation after the formation has been cooled and allowed to warm for a requisite time, the characteristics of the plugging agent employed, the time element involved in the warming, and subsequent treatment with acidizing medium or fracturing fluid, considerable flexibility is afforded in selectively isolating the more permeable streaks from the less permeable streaks.

In employing the instant invention as a means for effecting the selective acidization of a producing interval, any conventional acidizing agent suitable for the type of formation being treated may be employed. This includes but is not limited to the use of hydrochloric acid for the treatment of calcareous and dolomitic formations and fluophosphoric acids in the treatment of siliceous reservoirs. Similarly, conventional hydraulic fracturing techniques, such as those described in U. S. Patents 2,596,843; Reissue Patent 23,733; 2,664,954; 2,667,224; and 2,-667,457 may be employed. The instant invention is particularly adapted to the treatment of formations of varying permeability which exist within a single formation. However, by means of packers or other suitable devices, it is possible to similarly treat a plurality of adjacent formations which are separated by impermeable strata and which will provide a seat for the packing devices employed.

We claim:

1. A process for selectively isolating the less permeable streaks from the more permeable streaks of a subterranean geological formation traversed by a borehole, which comprises simultaneously forcing into said less permeable and more permeable streaks at a superatmospheric pressure, a liquid mixture of a liquefied, normally gaseous refrigerant and a sealant material having a melting point sufficiently below the normal temperature of the formation being treated whereby said sealant material is substantially completely in the liquid state at normal formation temperature, said pressure being sufficient to maintain said liquefied refrigerant in the liquid state, reducing said pressure whereby said refrigerant is vaporized thereby cooling said less permeable and more permeable streaks to a temperature substantially below the melting point of said sealant material and solidifying said sealant within said streaks to effect the sealing thereof, and shutting-in said borehole for a time sufficient for the temperature of the less permeable streaks to increase to a temperature in excess of the melting point of said sealant by natural heat conduction within said formation whereby the sealant in said less permeable streaks becomes liquid.

2. A process in accordance with claim 1 in which the sealant material is a wax.

3. A process in accordance with claim 2 in which the refrigerant employed in combinaiton with said sealant is a normally gaseous hydrocarbon.

4. A process for isolating the less permeable streaks from the more permeable streaks of a subterranean geological formation traversed by a borehole, which comprises simultaneously forcing into said less permeable and more permeable streaks, at a superatmospheric pressure, an admixture of a liquefied, normally gaseous refrigerant and a sealant material having a melting point sufficiently below the normal temperature of the formation being treated whereby said sealant material is substantially completely in the liquid state at normal formation temperature said pressure being sufficient to maintain said liquefied refrigerant in the liquid state, reducing said pressure whereby said refrigerant is vaporized thereby cooling said less permeable and more permeable streaks to a temperature substantially below the melting point of said sealant material and solidifying said sealant within said streaks to effect the sealing thereof, shutting-in said borehole for a time sufficient for the temperature of the less permeable streaks to rise to a temperature in excess of the melting point of said sealant whereby the sealant in said less permeable streaks becomes liquid, and thereafter forcing a formation penetrator into said less permeable streaks to reduce the resistance of said less permeable streaks to the flow of fluids therethrough, while said more permeable streaks remained sealed.

5. A process for isolating the less permeable streaks from the more permeable streaks of a subterranean geological formation traversed by a borehole, which comprises simultaneously forcing into said less permeable and more permeable streaks, at a superatmospheric pressure, an admixture of a liquefied, normally gaseous refrigerant and a sealant material having a melting point not less than about 10° F. below the normal temperature of the formation being treated, said pressure being sufficient to maintain said liquefied refrigerant in the liquid state, reducing said pressure whereby said refrigerant is vaporized thereby cooling said streaks to a temperature of substantially below the melting point of said sealant material and solidifying said sealant within said streaks to effect the sealing thereof, shutting-in said borehole for a time sufficient for the temperature of the less permeable streaks to rise to a temperature in excess of the melting point of said sealant whereby the sealant in said less permeable streaks becomes liquid, and forcing into said less permeable streaks a formation penetrator in an amount sufficient to reduce the resistance of said less permeable streaks to flow of fluids therethrough while said more permeable streaks remain sealed.

6. A method in accordance with claim 5 in which said sealant is a wax.

7. A method in accordance with claim 6 in which said sealant is a naturally occurring wax.

8. A method in accordance with claim 7 in which said sealant is a petroleum-derived wax.

9. A method in accordance with claim 6 in which the refrigerant in combination with said sealant is a normally gaseous hydrocarbon.

References Cited in the file of this patent

UNITED STATES PATENTS

| | | |
|---|---|---|
| 1,307,027 | Swan | June 17, 1919 |
| 2,223,804 | Kennedy | Dec. 3, 1940 |
| 2,259,428 | Shelley | Oct. 14, 1941 |
| 2,661,066 | Bond | Dec. 1, 1953 |
| 2,664,165 | Bond | Dec. 29, 1953 |
| 2,689,230 | Cardwell et al. | Sept. 14, 1954 |
| 2,693,855 | Bond | Nov. 9, 1954 |
| 2,693,857 | Marshall | Nov. 9, 1954 |